Feb. 19, 1935. G. SPATTA 1,991,988
METHOD FOR FORMING AXLE HOUSINGS
Filed Feb. 10, 1932 4 Sheets-Sheet 1

Inventor:
George Spatta
By Brown Jackson Boettcher & Dienner
Attys.

Feb. 19, 1935.  G. SPATTA  1,991,988
METHOD FOR FORMING AXLE HOUSINGS
Filed Feb. 10, 1932  4 Sheets-Sheet 2

Inventor:
George Spatta
By [signature] Attys.

Feb. 19, 1935.    G. SPATTA    1,991,988
METHOD FOR FORMING AXLE HOUSINGS
Filed Feb. 10, 1932    4 Sheets-Sheet 3

Inventor
George Spatta

Feb. 19, 1935.  G. SPATTA  1,991,988
METHOD FOR FORMING AXLE HOUSINGS
Filed Feb. 10, 1932   4 Sheets-Sheet 4

Inventor
George Spatta

UNITED STATES PATENT OFFICE 1,991,988

METHOD FOR FORMING AXLE HOUSINGS

George Spatta, Buchanan, Mich., assignor to Clark Equipment Company, Buchanan, Mich., a corporation of Michigan Application February 10, 1932, Serial No. 591,976

20 Claims. (Cl. 29—153.1)

This invention relates to a method for forming axle housings.

In my prior Patent No. 1,926,363, issued September 12, 1933, there is disclosed a method of forming a rear axle housing of the banjo frame type from a blank comprising, preferably, a seamless steel tube, and resulting, preferably, in a seamless housing. The present invention, which is an improvement upon said prior method, starts with a single sheet of thin hot rolled metal and produces a housing having a longitudinal weld or welds. A number of the steps of the operation in the latter method are the same or similar to the steps in the former method, but due to the employment of less expensive stock and to changes in the procedure of fabricating that stock, the housing produced by the present method costs materially less than the seamless housing produced by the prior method.

This reduction in cost is achieved principally by the use of a less expensive material. In the practice of the present invention perfectly satisfactory results can be achieved by using hot rolled sheet stock without pickling or cold rolling or oiling. The stock need not be of deep drawing grade since all the operations in which the metal is worked, except possibly the initial forming into tubular form, are done under heat. I start, therefore, with a cost of material which, in the case of an axle housing for a well known automobile, is at least 20% less than the cost of material for making the same size housing according to my prior process, and also less than the cost of material for sheet metal housings of other known methods.

A second factor assisting in the reduction of cost resides in the employment of the trimmings, or sheared off pieces, for forming reenforcing rings for the flanges of the banjo.

A third factor in reducing cost resides in the avoidance of waste. This is exhibited in several ways. As will be pointed out later in detail, I start with a thickness of the blank great enough to meet the critical section at the ends of the banjo frame under the operation of stretching out and forming the same. This thickness, of course, extends throughout the entire plate, as the blank is a sheet of substantially uniform thickness. If this stretching out of the banjo portion were not employed and a folding operation only relied upon to form the banjo frame, I would have to start with a blank, in one example, 15% wider for the full length of the blank and hence 15% greater in area.

By my method I save shearing off and wasting a certain part of the blank, as will appear more at length later. This feature enters into the process in the forming of the arms. If I did not shrink the diameter and elongate the arms I would have to increase the length of the blank by 3½ inches in the same example. By the same step of shrinking the diameter of the blank along the arms I increase the wall thickness where increased thickness is desirable for strength. To get the increased wall thickness I could start with a thicker and more expensive blank and even then I would have to trim off more of the sides of the blank and increase the length of the blank. In that event the banjo frame section would be thicker, when finished, than would be required for the strength of the arms.

Now from the above it will be appreciated that I start with substantially less material than that required for any other process of forming a welded housing and with less expensive material than is required for the seamless housing of my prior process. Furthermore, I wish to point out that this is the first sheet metal housing in which the wall thickness is varied as between parts required to sustain different degrees of stress, so that the strength of the various sections is graduated to the loads to be carried. Also, I believe that this housing is the first to have the brake flange upset (not folded) from sheet metal stock. No deep drawing is required, and the only steps in forming to final shape which are performed cold are the shrinking of the arms and throating of the junction of those arms to the banjo.

I begin with a rectangular blank of a thickness which will, after the operation of stretching and forming the banjo frame, leave a wall thickness of approximately, or slightly under, $\frac{3}{16}$ inch, in one example, where the maximum stretching has occurred. The finished thickness of the walls of the arms will be approximately $\frac{7}{32}$ inch. The blank is narrower than the circumferential length of the critical section where the banjo frame and throat join, by approximately 15% in the above example, and it is of a length about 3½ inches less than the length of the blank measured along the arms and over the banjo frame, after the arms have been subjected to the shrinking operation.

This rectangular blank is punched or slotted and sheared to form in the first operation. The shearing provides narrow strips from along the arm portions, which strips are later formed into reenforcing rings for the banjo frame flanges. The punching or slotting provides the slots which are later opened out to form the openings of the banjo frame.

The next operation is a shaping of the blank in dies to curve and form into semi-cylindrical shape the central cylindrical longitudinal portion of the blank. This operation forms also half of the conical joining portions between the center of the blank and the arm portions. The blank is next supported, and the edges of the walls of its mid-section turned slightly inward so that they may be properly registered with the dies by which they are closed peripherally to make the blank cylindrical. The blank then consists of a central cylindrical tubular portion suitably slotted, cylindrical arm portions, and conical or tapered tubular portions joining the arms to the central portion. The edges of the sheet metal abut longitudinally.

The joint or seam between the abutting edges of the sheet metal may be placed either on the top of the finished housing or 90° therefrom in either direction. Its location will be determined by the location of the slots initially punched in the stock. The choice of location of the seam will be determined by the kind of a weld used to join the abutting ends of the stock.

Preferably, the slots are punched equidistantly from the median line of the blank, and the weld is located upon the top side of the housing. Preferably, fusion welding is used, since it is of a character which will not materially change the quality of physical characteristics of the metal. This is desirable as the weld is later subjected to working, just like the rest of the metal of the blank. By locating the weld at the top of the housing the stresses placed upon it by the loads to which the housing is subjected in service will be mainly in compression.

After the abutting ends of the blank have been welded, the next operation consists in shrinking the end cylinders or arms of the blank by a single pass of ring dies over these arms, in a manner disclosed in my prior patent, No. 1,962,944, issued June 12, 1934.

The banjo frame is now heated at the center as shown in my Patent No. 1,926,354, issued September 12, 1933, and is then opened and formed according to the method of my first aforesaid application, and specifically as disclosed in my Patents No. 1,925,850, issued September 5, 1933, and No. 1,958,214, issued May 8, 1934. The blank is then throated as per my Patent No. 1,912,600, issued June 6, 1933.

The flanges of the banjo frame are then flattened as per the machine and method of my prior Patent No. 1,830,488, issued November 3, 1931, and are bored or machined to a true circle for forming gauge surfaces for the next operation of forming the brake flanges. The upsetting and forming of the brake flanges is performed as disclosed in my copending application, Serial No. 430,206, filed February 21, 1930.

The strips of metal sheared from the stock in the forming of the original sheet blank are then shaped as semi-circular strips and welded on the inside of the flanges of the banjo, and the outside surfaces of the flanges of the banjo and the brake flanges at the ends of the arms are machined to size and finish. Thereafter the spring seats are welded in place preferably in the manner shown in my prior Patent No. 1,830,488, issued November 3, 1931, or in the manner of construction and method disclosed in the patent issued to Mogford and Spatta, No. 1,908,856, May 16, 1933.

Axle housings made from two or more members welded together are old in the art, the most common of this type being the housings in which the upper and lower halves are formed from flat stock by a deep drawing process and then welded together to form the completed housing. As will be apparent to those skilled in the art, the method of my present invention is entirely different from these prior art methods, and is advantageous thereover for the reason that it preserves the advantages gained through the formation of a housing in accordance with the teachings of my above mentioned copending applications, notwithstanding that it materially reduces the cost of the completed housing.

In the practice of my invention I can employ hot rolled metal as a stock from which the blank is formed, thereby realizing an appropriate saving in the cost of fabricating the axle housing over the cost of forming such a housing by a deep drawing process, since in this latter process a cold rolled pickled and oiled stock of deep drawing quality must be employed, and this stock is more expensive. Furthermore, since during the formation of the axle housing from the piece of flat stock the stock is stretched both lengthwise and crosswise, a smaller piece of stock can be employed and a material saving in the cost of this stock is thereby realized.

Now to acquaint those skilled in the art with the teachings of my invention, reference is made to the accompanying drawings in which a preferred embodiment of it is shown by way of example, and in which.

Figure 1:
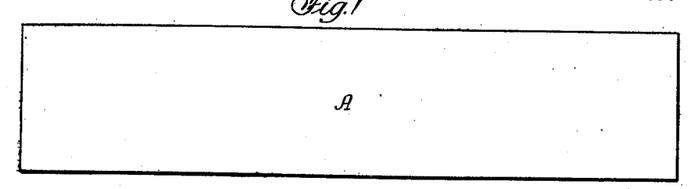
Figure 1 is a plan view of the sheet of stock.

Referring now to the drawings in more detail, in the practice of my invention I start with a piece of rolled steel, generally rectangular in shape as shown in Figure 1, and of proper thickness to meet the requirements of wall thickness in the finished axle housing. In one example this dimension is $\frac{3}{16}$ inch, although obviously it may be varied to suit requirements. Preferably, hot rolled stock of ordinary grade is used because of its low cost, although, if desired, more expensive cold rolled stock may be substituted. Since the blank is heated to prepare it for each step involving any extensive working of the metal, the added cost of cold rolled stock is not ordinarily warranted.

Figure 2:
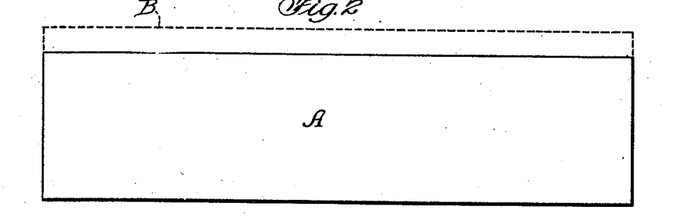
Figure 2 is a similar view showing the effective width of the stock.

I employ a blank A of stock of width shown in full lines in Figures 1 and 2. Due to the stretching of the stock in the subsequent banjo frame forming operation I gain a benefit of a strip of increased width of the outline shown in dotted lines B, Figure 2, along the full length of each blank. That is, the blank has an effective width indicated by the line B. The amount of stretching is about 15% in one example and hence forms a very real advantage. Any process depending upon mere forming, or folding, requires the width B to complete the housing.

Figures 4, 5, 6:
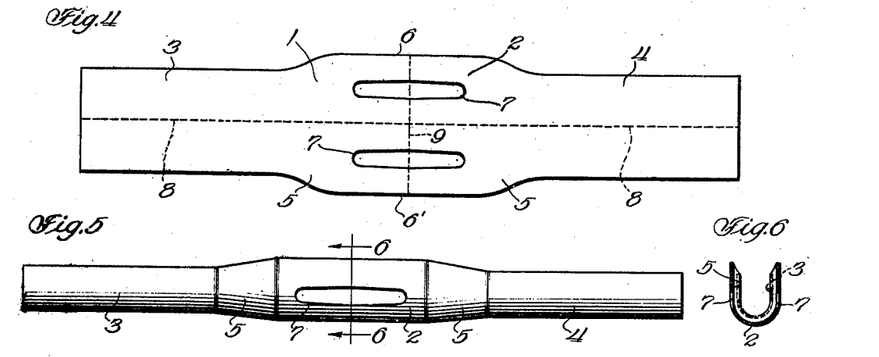
Figure 4 is a plan view of the blank.
Figure 5 is an elevational view of the blank at the completion of the first step in the forming process.
Figure 6 is a cross sectional view of Figure 5 taken along the line 6—6.

The first step of my process consists in punching and shearing the flat stock to form a blank 1 which is composed of a central substantially rectangular portion 2 and projecting ends 3 and 4, which are likewise rectangular, but of smaller width. The end portions 3 and 4 are joined to the central portion 2 by tapered portions 5. The width between edges 6 and 6' of the central portion 2 of the blank is slightly less than the width of the stock A, so that all of the edges of the blank 1 are sheared in the process of blanking.

The central portion 2 of the blank is preferably provided with slots 7 which are subsequently stretched to form the banjo frame opening of the housing. As shown, these slots are located equidistantly from the longitudinal median line 8 of the blank and so that the transverse median line 9 bisects them. With this arrangement, the welded joint of the finished housing is located on the top or bottom of the banjo frame. By suitable positioning of the slots 7 with respect to the median line 8 of the blank the welded seam may be positioned elsewhere, as will presently appear.

The operation of shearing the blank 1 from the stock may omit the forming of slots 7, since in certain instances it may be advantageous to form, or partially form, the blank prior to the piercing of the slots, because of the tendency of such slots to collapse during the forming operations. As shown the slots 7 are completely pierced and the slugs removed from the blank. This may be varied within the teachings of my invention, and the slots may be pierced in such a manner that the slug remains in the slot to be subsequently knocked out or otherwise removed during the formation of the housing. Such slugs are shown at 7' in Figure 21. By this arrangement the collapse of the walls of the slots during the formation of the blank may be prevented. Therefore I am not to be limited to the specific blank shown by way of example.

Nor is the formation of oval shaped slot 7 at this time essential to the teachings of my invention, as small holes may be substituted and the slot 7 subsequently formed in the manner specifically shown and described in my Patent No. 1,895,589, issued January 31, 1933, or by other suitable means.

Figure 3:
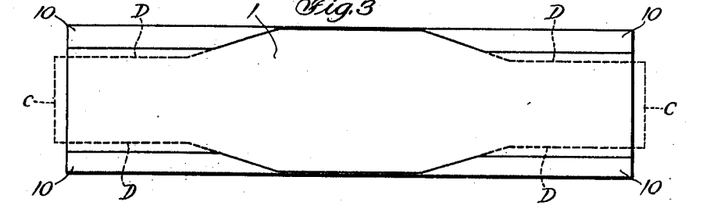
Figure 3 is a plan view of the stock showing the manner of shearing the blank therefrom.

The shearing of the blank 1 from the stock A produces four strips 10 which, within the teachings of my invention, are not scrapped but are subsequently employed to form reinforcing rings for the central banjo flange, as will presently appear.

The flat blank 1 is formed into a cylinder, preferably by first forming it into a U-shape such as is shown in Figures 5 and 6, the central portion 2 of the blank being thus formed on a radius appreciably greater than the radius upon which the end portions 3 and 4 are formed, and with the end and central portions disposed coaxially. This forming operation is performed cold, in an ordinary punch and die operation. There is a slight working of the metal in this operation, particularly in the tapered portions 5—5, but this is not ordinarily sufficient to require that the operation be performed hot. The center of the bend performed by this operation is on the median line 8 of the blank so that the slots 7 are disposed on opposite sides of the U at the junction of its straight and curved portions.

Figures 7, 8:
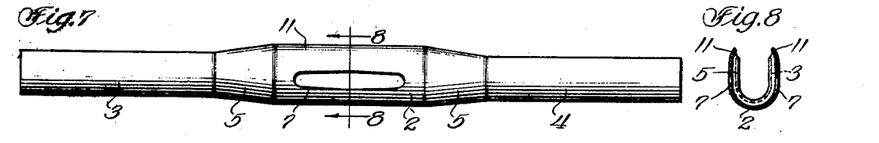
Figure 7 is a plan view of the stock at the completion of the next step in the process.
Figure 8 is a cross sectional view of Figure 7 along the line 8—8.

The U-shaped blank thus formed is next registered with a suitable die, which supports the central portion 2 of that blank and, through the action of a cooperating punch, forms the edge portions of that section inwardly in an arcuate path as shown at 11 in Figures 7 and 8. The radius of curvature of the inward projection 11 is preferably somewhat greater than the radius of the central cylinder subsequently to be formed from the section 2 of the blank, although if desired the same radius may be used. The portions 11 are thus bent inwardly to properly register the central sections with the cylinder forming dies, as will presently appear.

Figures 9, 10:
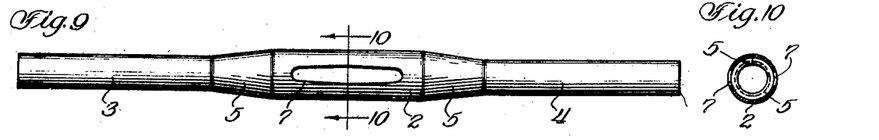
Figure 9 is a view of the completed blank.
Figure 10 is a cross sectional view of Figure 9 along the line 10—10.

The U-shaped member is next placed in suitable dies, each of approximate semi-cylindrical shape, and operated on to bring the edges of the blank into abutment and then to apply radial pressure to form it into a cylinder formed of parts of different diameter and upon a common axis, as is shown in Figures 9 and 10.

Preferably the dies employ plug members which support the edges of the slot 7 to prevent collapse of these slots during the forming operation. The central portion 2 forms a large diameter cylinder which is connected by frusto conical sections 5 to the smaller diameter end or arm sections 3 and 4, and the seam formed by the abutting edges of the blank projects longitudinally of the cylinders midway between the slots 7.

Figures 11, 12:
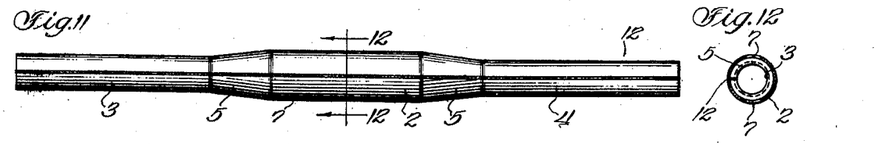
Figure 11 is a plan view of the blank showing the weld.
Figure 12 is a cross sectional view of Figure 11 along the line 12—12.

After the blank has thus been formed the abutting edges are united to close the cylindrical structure, preferably by a fusion weld as shown at 12 in Figures 11 and 12. I have found that a hydrogen weld is satisfactory for this purpose as the joint thus formed is itself as highly workable as the metal itself. Other forms of welding may be used. However, the fused metal should have substantially the same physical and chemical makeup as the original metal.

With properly designed punches and dies used in forming the blank the resulting cylindrical section is quite true and no great additional amount of shaping is required. I am particularly anxious to have the central portion 2 of the blank formed into a fairly accurate cylinder. However, I find that it is advantageous to pass a die over the end cylinders 3 and 4 to shrink them, thereby making them truly cylindrical and also elongating them. The degree of displacement by this shrinking operation is not great, that is, the outside diameter of the cylinder need not be changed more than approximately one-half an inch by the operation. The operation also aligns the end cylinders 3 and 4 with their axes coincident with the axis of the central cylinder 2, so that the resulting piece is straight and true in all dimensions.

It is to be observed that for different axle housings different sizes of banjo frame and different sections of the arm may be desired. This may be accomplished by properly designing the blank and the cooperating steps of forming and working. The present method permits of unusually close economy in material which is the chief item of cost in producing the housing in which economy is possible.

I have above explained the operation of swedging the arms by passing ring dies over the same to secure a number of desirable features, among which are proper sizing, straightening and finishing, and also in keeping the wall thickness of the arms and increasing their length. A peculiar advantage is gained by the increase in length of the housing. If the arms were not swedged I would have to use a longer blank as indicated by the dotted end portions C of Figure 3. Then also I would not gain the increase of thickness of the section of the arm over the thickness of the central or banjo portion. This would mean the use of a heavier blank and a resultant useless increase in the weight of the finished housing. Also, if the thickness of the blank were such as to provide the full thickness of the arm sections I would have to cut away additional stock as indicated by the dotted line D on Figure 3 because the finished circumference would be less by the amount which I expend in the swedging operation.

Figure 14:
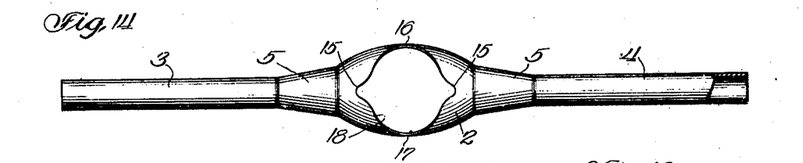
Figure 14 is an elevational view of the blank at the end of the first step in the formation of the central banjo.

The stretching operation which I perform on the metal of the throat or junction of the arms and banjo frame occurs chiefly at the central part indicated at 15—15, Figure 14. This thins the metal, but the thinning occurs chiefly on the neutral axis where the thickness need not be as great as on the outer circular periphery of the banjo frame. From this it will be seen that the housing of my invention is of a peculiarly economical design not obtainable by the prior methods of making sheet metal housings.

Figure 13:
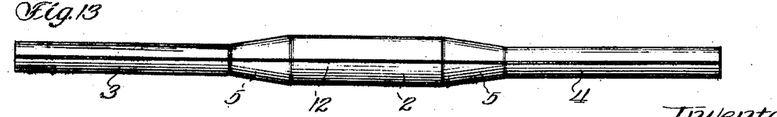
Figure 13 is a plan view of the blank after shrinking the arms thereof.

The preferred manner of forming an axle housing from the cylindrical blank shown in Figure 13 is first to heat the mid section of the blank in the manner shown in my Patent No. 1,926,354 and to insert a suitable tool into the slots 7 and spread the blank into the shape shown in Figure 14, so that the slots 7 are stretched out into generally circular shape as the walls of the large central cylinder 2 are spread. This operation flattens the central portions 16 and 17 of the walls as shown in Figure 14, to form a substantially cylindrical transverse opening 18. This step and the means and methods involved therein are disclosed in detail in my Patent No. 1,925,850, of September 5, 1933, aforesaid. The opening 18 is large enough to pass over the internal expanding dies employed in connection with external contracting dies for shaping the cylindrical banjo frame portion. This step and the means and method involved therein are disclosed in detail in my Patent No. 1,958,214 aforesaid.

Figures 22, 23:
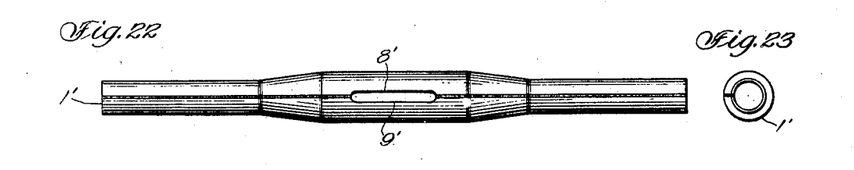
Figure 22 is a view similar to Figure 11 and showing a completed cylinder formed from the blank of Figure 21.
Figure 23 is an end view of Figure 22.

During this spreading operation, and during the subsequent forming operation, as shown in Patents Nos. 1,925,850 and 1,958,214 the weld is subjected to some stresses, but since the operation is also formed with metal of the blank at forging temperature and the weld is a hydrogen fusing weld or its equivalent, the seam is not opened. Since the weld is located between the slots 7 it is not subjected to a direct pull but mainly a bending action accompanied by some lengthwise stretching. If the weld 12 is placed so that it intersects the slots 7, as shown in Figures 22 and 23, it will be subjected to a more direct pull but even then the seam will not be opened.

Figure 16:
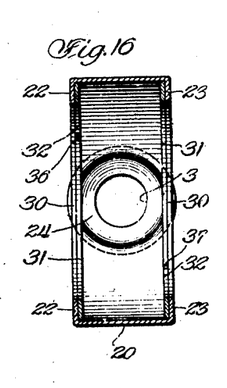
Figure 16 is a cross sectional view of Figure 15 taken along the line 16—16 and drawn to an enlarged scale.

As is outlined in my above mentioned Patents Nos. 1,926,353 and 1,958,214 after the walls of the blank have been spread in the manner shown in Figure 14, the aforesaid set of expanding dies are placed inside of the blank and a set of contracting dies disposed outside thereof, and by operation of these dies the welds of the blank of Figure 14 are stretched into a central general cylindrical flanged banjo 20 having inwardly turned flanges 22 and 23, as shown in Figure 16. Connected to the banjo thus formed are throat sections 24 and 25 formed from the tapered or frusto conical portion 5 of the original blank, which sections 24 and 25 connect the end cylinders 3 and 4 to the banjo. The inner margins of the throat sections 24 and 25, i. e., at the ends of the slots are stretched and thinned. This is not objectionable, as above pointed out, because the metal is on or near the neutral axis of the housing and does not need to be as thick as it is on the outer circular part of the banjo frame, and not nearly as thick as the arm sections.

The banjo frame is now substantially finished in form, although in the rough. The throat sections 24 and 25 are next formed smooth by internal and external forming dies, drawn together for each throat through the adjacent arm, as disclosed in my Patent No. 1,912,600 issued June 6, 1933, to which specific reference is made for full disclosure.

The flanges 22 and 23 are flattened into substantially parallel planes on their outer surfaces. A suitable machine and mode of operation for doing this is disclosed in detail in my Patent No. 1,830,488, to which specific reference is made for a detailed disclosure.

The banjo frame is then bored out to bring the edges of the flanges to and substantially concentric with the outer walls of the banjo frame. The edges of the flanges serve as reference surfaces, or gauge points for subsequent operations and specifically it is a gauge surface for the forging operations which upset the ends of the arms, gather metal and throw out the brake flanges.

After the banjo has thus been formed the end sections of the blank are heated and formed into bearing receiving sockets 26 and 27 and brake flanges 28 and 29 by a series of endwise forging operations explained in my first above mentioned copending application and in detail in my copending application No. 430,206, to which reference is now made.

Figure 17:
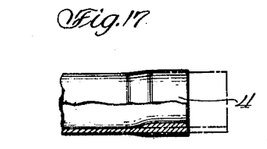
Figure 17 is an elevational view, partly in section, at the completion of the first step in upsetting the ends of the blank.
Figure 18:
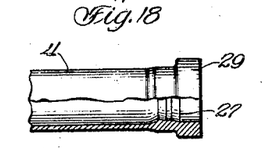
Figure 18 is a view similar to Figure 17 showing the blank at the end of the second forging operation.
Figure 19:
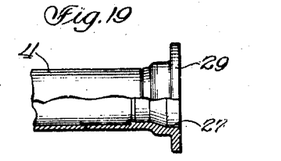
Figure 19 is a view similar to Figures 17 and 18 showing the completed end section of the housing.

Preferably this end forming operation is performed by a plurality of upsetting operations on each end of the axle, so that the metal in the walls of the blank is moved a definite amount during each step of the process. The first of these steps substantially thickens the walls of the end section in the manner shown in Figure 17. The next step forms a part of the bearing receiving socket such as 26 and 27 and a part of the flange such as 28 and 29 in the manner shown in Figure 18; and the last step completes the shaping of the bearing receiving socket and throws out the flange in the manner shown in Figure 19.

Figure 26:
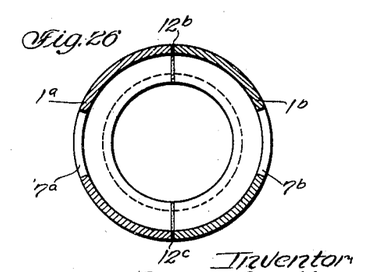
Figure 26 is a cross sectional view of the blanks of Figures 24 and 25 assembled and welded, and drawn to an enlarged scale.
Figure 28:
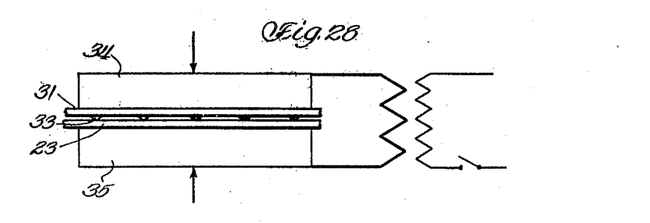
Figure 28 is a diagrammatic view illustrating the method of welding the reinforcing ring to the banjo flange.

The weld 12 or welds 12b, 12c, Figure 26, are of course included in the working of the metal to form the sockets and flanges, and insofar as I am aware, I am the first to perform such operations successfully upon a sheet metal housing. I have found that if the weld is properly made it is not damaged by the operations, and the resulting sockets and flanges are integral with each other and with the end cylinder of the housing.

The weld is completely obliterated in the forging operation and cannot be detected in the finished product. This is new in respect to welded sheet metal housing, and I intend to claim the same broadly.

The banjo 20 is provided with inwardly depending flanges 22 and 23, Figure 16, which terminate in circular openings 30 through one of which the differential mechanism of the axle is passed. This mechanism is held in place by bolts or set screws projecting into one of the flanges 22 or 23. Since the wall thickness of the flanges is not any greater than the wall thickness of the blank 1, and in fact, in some parts slightly thinner, that is approximately $\frac{3}{16}$ of an inch, there is not room for a great number of threads to be cut in it.

Figure 15:
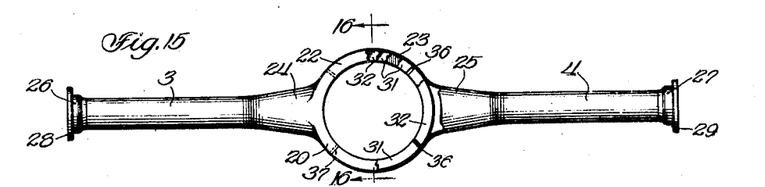
Figure 15 is an elevational view of the completed axle housing.
Figures 20, 27:
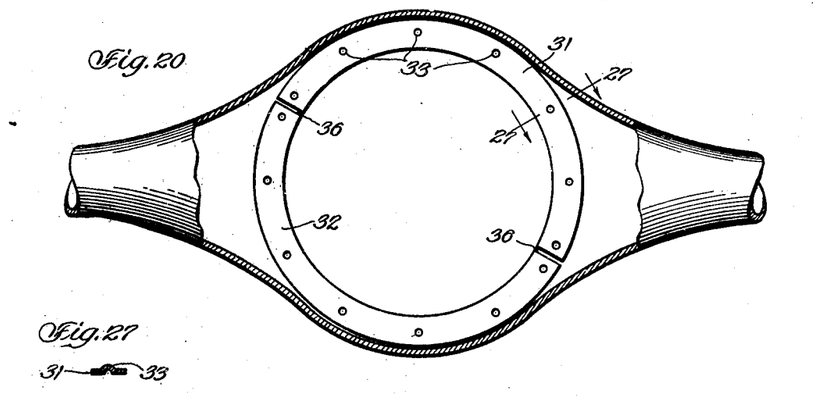
Figure 20 is an elevational view, partly in section, showing the application of the reinforcing rings to the central banjo flange.
Figure 27 is a fragmentary cross sectional view taken substantially along the line 27—27 of Figure 20 showing the details of construction of the reinforcing rings.

I reinforce the flanges 22 and 23 by taking the scrap 10 cut from the blank 1 in the first step of my improved process, and form this scrap into arcuate semi-circular plates 31 and 32 which are laid inside of the axle housing against the back plate face of the flange 22 and attached thereto in any preferred manner, such as by welding. This operation doubles the thickness of the flange and therefore doubles the number of complete threads that can be cut in it, with the result that an ample number of threads are provided to securely seat the cap screws which hold the differential mechanism in the housing. One of the two flanges supports the pinion shaft and differential mechanism. The other flange holds a cover plate on the housing. The cap screws by which this cover plate is thus secured are not subjected to a great strain. Both flanges are thus reinforced and the trimmings 10 from the blank provide two complete reinforcing rings as shown in Figures 15, 16, and 20.

As will be seen in Figures 16, 20, 27 and 28, these reinforcing ring sections 31 and 32 are stamped to provide a series of round bumps or hollow projections 33 for the purpose of forming localized welds.

A pair of electrodes 34 and 35 are placed on a movable ram and on a stationary anvil, respectively, of a hydraulic or similar press, and engage the ring section 31 or 32 and the flange 22 or 23, respectively. Welding current is then applied to weld the projections firmly to the flange. The ram and anvil flatten down the ring section upon the inside of the flange. The welds do not spread beyond localized spots, but these are very firmly united, and the flattening out of the projection of the two parts, namely, ring and flange, provides a highly satisfactory reenforcement for the flanges. The short unwelded sections of the ring between the welds are very stiff. The joints 36 between the ring section are preferably disposed as shown in Figures 15 and 20, as this provides the necessary strength of two critical points, namely, across the vertical center and across the throat. Also, the joints on the two sides are reversed, i. e., left and right, as shown by lines 37 in Figures 15 and 16. Obviously, a complete ring could not be inserted. While the above is a preferred disclosure of the joints or splits in the rings it is not essential and may be optionally varied.

The axle housing thus formed retains all the advantages that are acquired in the process outlined in my first above mentioned patent. It is strong and light, and where the weld 12 is located on the top of the housing the stresses to which it is subjected are mostly in compression and the weld has sufficient strength to resist the shocks placed upon it in service. With the weld located 90° from the top of the housing, as shown in Figures 22 and 23, it is on a substantially neutral axis and again has ample strength to resist the shocks placed upon it in service. With the welds properly made, the formation of the banjo 20 and flanges 22 and 23 thereon can be accomplished without tearing the edge of the weld.

Figure 21:
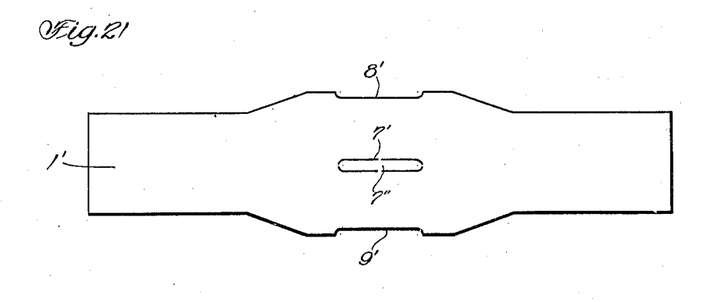
Figure 21 is a plan view of a modified form of blank.

The welds may be located as in Figures 22 and 23 by forming the blank 1' as shown in Figure 21. One slot 7' is punched on the median line of the blank and two half slots 8' and 9' are punched at its edges. Slug 7" is shown in the slot 7' to illustrate that method of preventing collapse of the walls of the blank.

It is contemplated within my invention to make the housing shown in Figure 15 not only by the specific method above disclosed but also by variations therefrom. It is broadly new in my invention to make up a semi-finished form of sheet metal welded together by fusion welds in one or more seams and then to expand or contract or work the semi-finished form into final form. Instead of a single longitudinal seam, I may employ halves welded together or, in fact, quarters welded together; then work the partially finished form into final form by stretching or expanding, as in the case of the banjo frame; or by shrinking or swaging, as in the arm portions, or by upsetting, expanding and throwing out a flange, as the brake flange and bearing seats 27 and 29 at the end of the arm.

Figure 24:
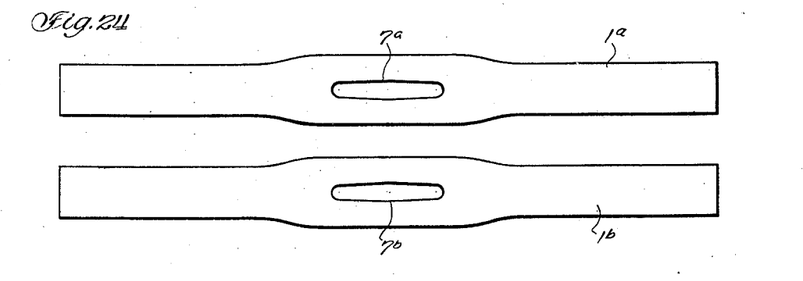
Figure 24 is a plan view of the blanks for forming a two piece housing.
Figure 25:
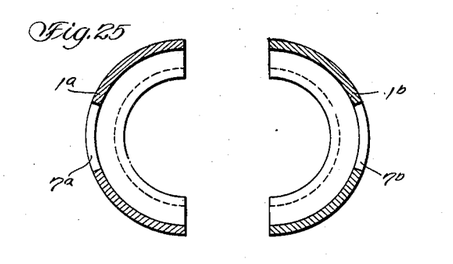
Figure 25 is a cross sectional view of the blanks of Figure 24 after forming and prior to assembly, and drawn to an enlarged scale.

For example, I may provide two longitudinal blanks 1a and 1b which may be slotted as at 7a and 7b, respectively, as shown in Figure 24, and then formed into semi-cylindrical halves like the bottom part of Figure 6, as shown in Figure 25. Then the two semi-cylindrical halves may be welded into longitudinal seams 12b and 12c lying at 90° to the slots, as shown in Figure 26, or elsewhere as desired. Then the partially finished form may be brought into final form as above described. In each case the thickness of the stock must be carefully selected so that when the various steps that are to be performed upon the stock are effected, the final section is as desired, to give the requisite strength without excess and without undue waste in the blank. However, to form the blanks 1a and 1b as shown in Figures 24, 25 and 26, results in a greater loss of material than is occasioned by forming the blank as in Figures 4 or 23, and the fabrication of housings from two pieces is therefore more expensive.

Thus it will be seen that I have provided a method of making a high grade sheet metal axle housing which can be carried out more cheaply than the prior known methods which start from either a tubular or sheet metal stock.

Figure 29:
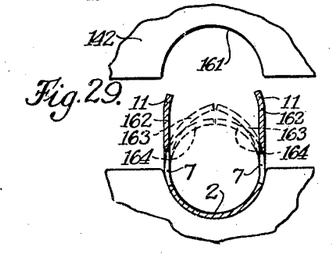
Figure 29 is a diagram illustrating the positions assumed by the central cylinder of the blank during the operation of the forming die.

As will be seen in the diagrammatic illustration in Figure 29, the arcuate portions 11 of the blank insure that the die portion 161 will embrace the outer surfaces of the blank. The die portion 161 can therefore be made with true semi-circular section. As the die 142 descends, section 161 bends the arms 162 of the blank first into the position 163 shown in dotted lines, and then into the final form as shown by dotted lines 164. It will be noted that the blank is of perfect circular section. The plugs 144 and 145 have been omitted from Figures 28 to avoid an unnecessary complication of the figure.

While I have chosen to illustrate my invention by drawings illustrating a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. The method of making an axle housing of sheet metal which comprises, shearing out a blank of approximate outline required for forming a tubular central portion and tubular arm portions of smaller diameter, forming the blank into tubular shape with a longitudinal seam, welding the longitudinal seam, shrinking the metal in the arms to gain the benefit of a longer blank, and stretching the metal in a part of the central portion to gain the benefit of a wider blank.

2. The method of making an axle housing of sheet metal which comprises, forming a rectangular sheet of stock of a thickness intermediate between the greater final thickness of the arms and less final thickness of the throat of the banjo frame, shearing out a blank of approximate outline required for forming a tubular central portion and tubular arm portions of smaller diameter, forming the blank into tubular shape with a longitudinal seam, welding the longitudinal seam, shrinking the metal in the arms to gain the benefit of a longer blank, and stretching the metal in a part of the central portion to gain the benefit of a wider blank.

3. The method of making an axle housing of the banjo frame type from sheet metal stock which comprises, cutting the stock into approximate pattern of the developed banjo and arm portions, curving the parts of the pattern to bring the edges into register to form a tubular blank of greater diameter along the central portion than along the end portions, welding said edges by fusion welds to form a tubular blank having a central portion and arm portions, and shrinking the arm portions to increase their wall thickness and to bring them to an accurate size.

4. The method of making an axle housing of the banjo frame type from sheet metal stock which comprises, cutting the stock into approximate pattern of the developed banjo and arm portions, curving the parts of the pattern to bring the edges into register to form a tubular blank of greater diameter along the central portion than along the end portions, welding said edges by fusion welds to form a tubular blank having a central portion and arm portions, shrinking the arm portions to increase their wall thickness and to bring them to an accurate size, and stretching and forming the central part of the tubular blank into a banjo frame.

5. The method of making an axle housing of the banjo frame type and of different thickness at different parts thereof from sheet metal stock of uniform thickness, which comprises, cutting the stock into approximate pattern of the developed banjo and arm portions, curving the parts of the pattern to bring the edges into register to form a tubular blank of greater diameter along the central portion than along the end portions, welding said edges by fusion welds to form a tubular blank having a central portion and arm portions, and subsequently radially shrinking said arm portions from said central portion outwardly along said arm portions to increase the wall thickness of said arm portions whereby the length of said arm portions is increased.

6. The method of making an axle housing of the banjo frame type from sheet metal stock which comprises, cutting the stock into approximate pattern of the developed banjo and arm portions, curving the parts of the pattern to bring the edges into register to form a tubular blank of greater diameter along the central portion than along the end portions, welding said edges by fusion welds to form a tubular blank having a central portion and arm portions, shrinking the arm portions to increase their wall thickness and to bring them to an accurate size, and upsetting the edges of the welded arms to form integral brake flanges.

7. The method of making an axle housing of the banjo frame type out of sheet metal stock which comprises, cutting the stock into a plurality of blanks making up an approximate pattern of the developed banjo frame and arm portions, slotting the blanks for banjo frame openings, forming the blanks into cylindrical parts, fusing the edges of the blanks to provide a tubular blank, and shrinking the arm portions of the tubular blank to increase their wall thickness and extend the length of the same.

8. The method of making an axle housing of the banjo frame type out of sheet metal stock which comprises, cutting the stock into a plurality of blanks making up an approximate pattern of the developed banjo frame and arm portions, slotting the blanks for banjo frame openings, forming the blanks into cylindrical parts, fusing the edges of the blanks to provide a tubular blank, shrinking the arm portions of the tubular blank to increase their wall thickness and extend the length of the same, and working the metal of the tubular blank to expand the central part into a banjo frame.

9. The method of forming a rear axle housing which comprises, cutting a piece of flat stock to proper length and breadth, cutting strips from the corners of said stock, forming the stock into a cylindrical blank, forming the blank into a banjo frame axle housing, forming said strips into arcuate reinforcing plates, and attaching said plates to the inner margins of the banjo frame.

10. The method of making an axle housing from sheet metal stock which comprises, shearing and perforating a blank from the sheet metal, forming the blank into a U shape by bending along the median line of the same, bending the free edges of the middle portion of the blank inwardly in an arcuate path, closing the U to make the blank cylindrical with its edges abutting, welding the abutted edges, shrinking the end sections of the cylinder to increase the wall thickness and length of the same, stretching out the perforated section of the blank, forming that section into a flanged banjo frame, and forging the ends of the blank to thicken the walls of the same and to form a bearing seat and a flange.

11. The method of forming an axle housing from sheet metal stock which comprises, punching a pair of oval holes in the stock and shearing it to form a blank having a wide central portion and narrower end portions, bending the blank U shaped with the holes equidistant from the median line of the bend, the central portion of the blank being bent on a longer radius than the end portions, supporting the side walls of the central portion of the blank and bending the edges of those walls slightly inwardly, supporting the edges of said oval holes and forcing the edges of the blank into abutment to close the same and form coaxial cylinders joined by tapered portions, uniting the abutted edges of the blank by fusion welds, and forming the cylinders to the required shape.

12. The method of forming an axle housing from sheet metal stock which comprises, punching a pair of oval holes in the stock and shearing it to form a blank having a wide central portion and narrower end portions, bending the blank U shaped, the central portion of the blank being bent on a longer radius than the end portions, supporting the side walls of the central portion of the blank and bending the edges of those walls slightly inwardly, supporting the edges of said oval holes and forcing the edges of the blank into abutment to close the same and form coaxial cylinders joined by tapered portions, uniting the abutted edges of the blank by fusion welds, shrinking the end cylinders to straighten them and to gain an advantage in their wall thickness and length, spreading the center cylinder to increase the length and to reduce the wall thickness thereof, forming the midsection into a banjo frame, and forming brake plate flanges on the free ends of the end cylinders.

13. The method of making an axle housing from sheet metal stock which comprises, shearing a rectangular piece of stock to form a blank having a comparatively wide perforated midsection joined to smaller width end sections by tapered portions, bending the blank on its median line and between the perforations in said midsection to form it into a U shape, turning in the edges of the midsection, closing the U to form coaxial small diameter end cylinders joined to a larger diameter midsection cylinder by tapered portions and with the edges of the blank abutted, uniting the edges of the blank by fusion welds, shrinking the end cylinders to increase the wall thickness and length of the same, stretching the midsection cylinder to spread it and to reduce the wall thickness of the same, forming the midsection into a flanged banjo frame, forging the ends of the blank to thicken the walls of the same and to form a bearing seat and a flange throat, forming semi annular plates from the material sheared from said rectangular piece of stock, and welding said plates to the flanges of said banjo to reinforce and thicken the same.

14. The method of making an axle housing of sheet metal which comprises the following steps, forming a rectangular sheet metal blank of a thickness intermediate between the greater final thickness of the arms and the less final thickness of the throat of the banjo frame, shearing out a blank wider at the central banjo part than the ends or arm parts, the width of the central part being less than the circumferential length of the metal at the largest closed section of the finished housing, and the width of the ends being greater than the circumferential length of the arms in the finished housing, closing the blank into tubular form, shrinking the end parts to form tubular arms, and stretching out the central part to form a banjo frame.

15. The method of making an axle housing of the banjo frame type from sheet metal stock which comprises, cutting the sheet stock into the approximate pattern of the developed banjo frame and arm portions, forming the pattern into substantially cylindrical wall portions of greater diameter along the central portion than along the end portion, uniting the edges of the wall portions by fusion welding to provide a tubular blank having a banjo frame portion and arm portions, shrinking the arm portions radially to increase their thickness and upsetting the ends of the arms to form an integral brake flange.

16. The method of making an axle housing of the banjo frame type from sheet metal stock which comprises, cutting the sheet stock into the approximate pattern of the developed banjo frame and arm portions, forming the pattern into substantially cylindrical wall portions of greater diameter along the central portion than along the end portion, uniting the edges of the wall portions by fusion welding to provide a tubular blank having a banjo frame portion and arm portions, changing the wall thickness of a portion of said blank between the end thereof and the central portion of enlarged diameter after the welding operation by radial shrinking to increase the length of said arm portions, and upsetting the ends of the arms to form an integral brake flange.

17. The method of making an axle housing of the banjo frame type out of sheet metal stock which comprises, cutting the stock into a blank of an approximate pattern of the developed banjo frame and arm portions, slotting the blank for banjo frame openings, forming the blank into cylindrical parts of larger diameter at the center and smaller diameter at the arms, then fusing the edges of the blank to provide a tubular blank, and shrinking the arm portions of the tubular blank to increase their wall thickness and extend the length of the same.

18. The method of making an axle housing of the banjo frame type out of sheet metal stock which comprises, cutting the stock into a blank of an approximate pattern of the developed banjo frame and arm portions, slotting the blank for banjo frame openings, forming the blank into cylindrical parts of larger diameter at the center and smaller diameter at the arms, then fusing the edges of the blank to provide a tubular blank, shrinking the arm portions of the tubular blank to increase their wall thickness and extend the length of the same, and working the metal of the tubular blank to expand the central part into a banjo frame.

19. A blank for forming a banjo frame axle housing comprising a flat plate of metal having a thickness substantially equal to the required wall thickness of the banjo frame part of the housing, said blank consisting of a central rectangular portion having an oval slot located at its midpoint and half slots cut in each of the two edges of the portion, and projecting end sections of smaller width than the central portion formed integrally with said central portion.

20. The method of making a banjo frame housing from flat stock which comprises, forming a flat blank of a width less than the developed length of the cross section of the finished housing throat, of a length less than the length of the tubular blank after the arms are sized, and of a thickness substantially equal to the thickness of the throat wall of the finished banjo frame, shearing off substantially parallel sided strips with tapering ends from the end parts of the side margins of the blank to leave a wide central portion and narrower arm portions of the blank, punching the blank to form openings for the banjo frame, die shaping the central and the end portions into coaxial cylindrical members joined by conical portions all having a longitudinally extending seam, welding said seam, die shrinking the diameter of said arms and thereby extending the same axially, and then heating the central portion and opening out and forming the banjo frame.

GEORGE SPATTA.